(12) United States Patent
Scarborough, III et al.

(10) Patent No.: US 6,426,027 B1
(45) Date of Patent: Jul. 30, 2002

(54) METHOD OF INJECTION MOLDING FOR CREATING A FLUID METER HOUSING

(75) Inventors: John R. Scarborough, III, Auburn; Brent M. Walden, Montgomery, both of AL (US)

(73) Assignee: Neptune Technology Group, Inc., Tallassee, AL (US)

( * ) Notice: Subject to any disclaimer, the term of this patent is extended or adjusted under 35 U.S.C. 154(b) by 0 days.

(21) Appl. No.: 09/572,467

(22) Filed: May 17, 2000

(51) Int. Cl.[7] ........................... B29C 33/76; B29C 45/00
(52) U.S. Cl. ........................... 264/219; 164/6; 264/221; 264/317
(58) Field of Search ................ 264/221, 317, 264/219; 164/6

(56) References Cited

U.S. PATENT DOCUMENTS

| | | | | |
|---|---|---|---|---|
| 3,480,708 A | * | 11/1969 | St. Clair | 264/317 |
| 3,499,634 A | * | 3/1970 | Rea | 264/317 |
| 3,882,220 A | * | 5/1975 | Ryder | 264/317 |
| 4,391,139 A | | 7/1983 | Sutherland et al. | |
| 4,743,481 A | * | 5/1988 | Quinlan et al. | 264/259 |
| 5,173,237 A | | 12/1992 | Kidd | |
| 5,184,874 A | | 2/1993 | Olson et al. | |
| 5,257,922 A | | 11/1993 | Vansnick et al. | |

FOREIGN PATENT DOCUMENTS

| | | | | |
|---|---|---|---|---|
| CH | 530 249 | * | 12/1972 | 264/317 |
| EP | 0708318 A1 | | 4/1996 | |
| JP | 62-268613 | * | 11/1987 | 264/317 |
| JP | 63-60716 | * | 3/1988 | 264/317 |
| JP | 63-92419 | * | 4/1988 | 264/317 |
| JP | 5-169496 | * | 7/1993 | 264/317 |

* cited by examiner

Primary Examiner—Allan R. Kuhns
(74) Attorney, Agent, or Firm—Dority & Manning, P.A.

(57) ABSTRACT

A method of creating a fluid meter housing is disclosed wherein molten material is injected into a cavity formed between a core and a mold. After cooling, the material assumes the shape of the housing and contains the core. Upon heating, the core melts and may be removed from the interior of the housing.

4 Claims, 7 Drawing Sheets

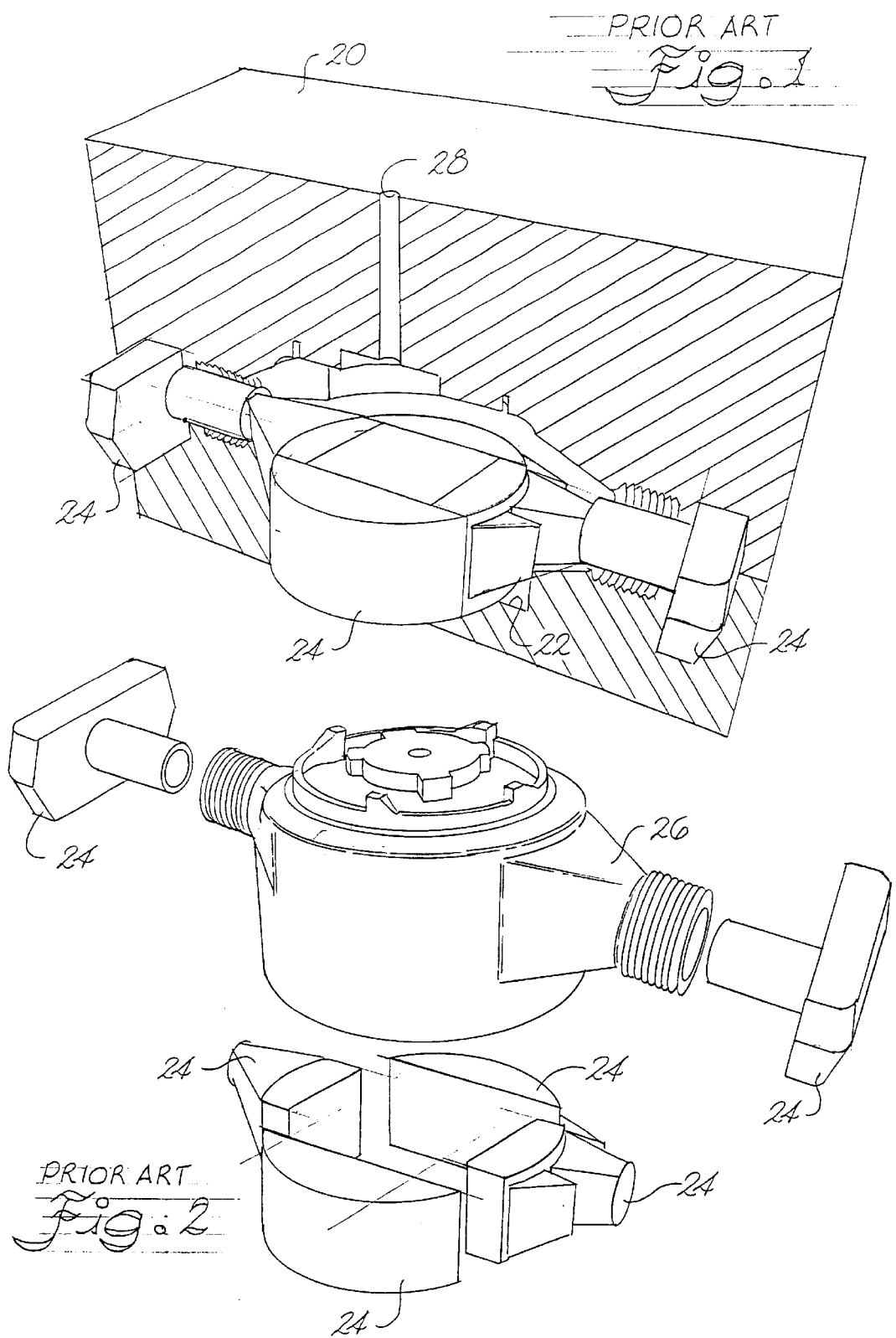

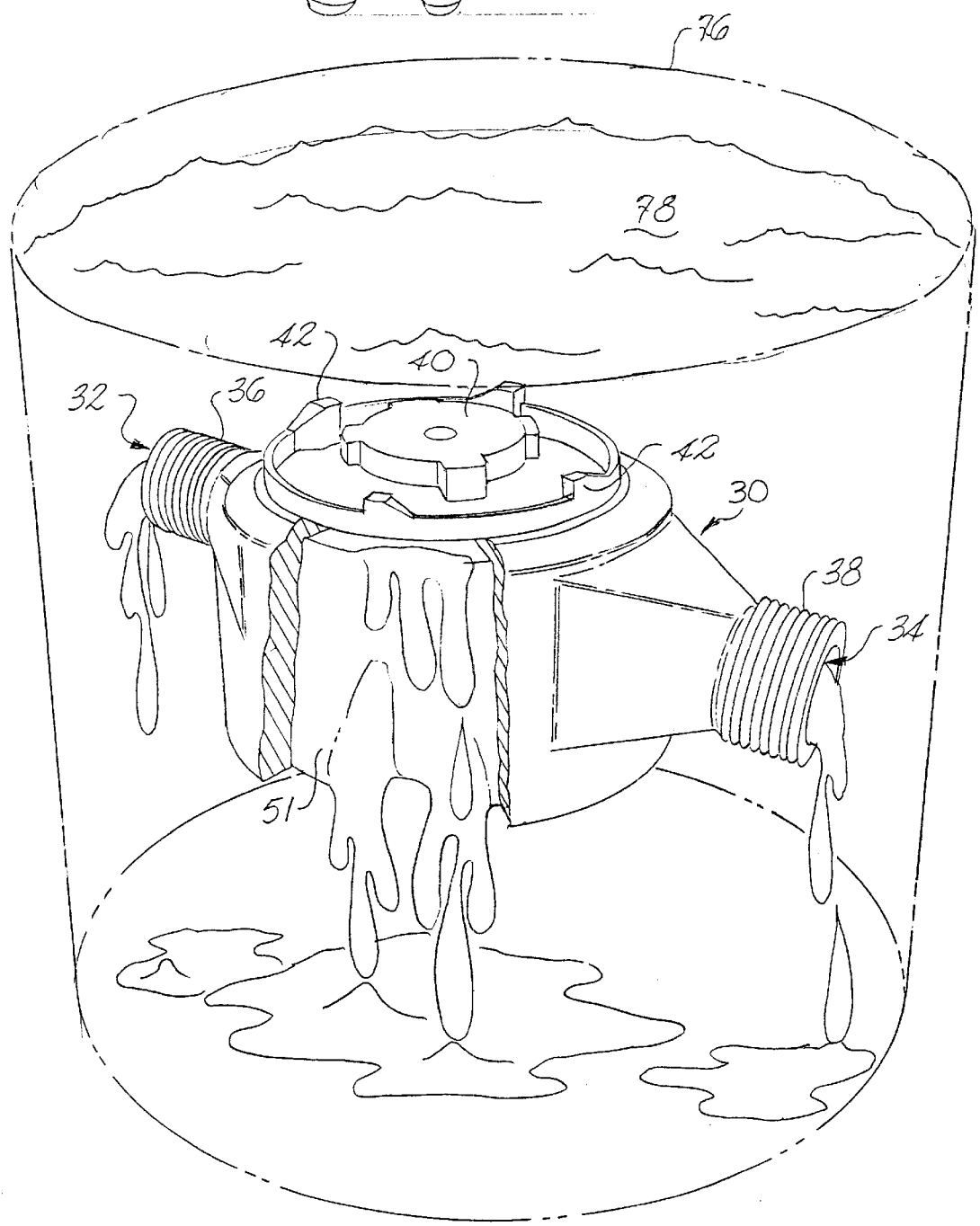

METHOD OF INJECTION MOLDING FOR CREATING A FLUID METER HOUSING

FIELD OF THE INVENTION

The present invention relates to a method of creating a fluid meter housing. More specifically, the present invention provides a method of manufacturing the housing for a fluid meter in which a molten material is injected into a cavity formed between a core and a mold. The core and mold are configured so that the cavity is shaped as desired for the fluid meter housing. After allowing the molten material to harden, the housing and enclosed core are removed from the mold. The core is then heated to its melting point and drained from within the fluid meter housing.

BACKGROUND OF THE INVENTION

Fluid meters have traditionally been constructed from various metals such as bronze and copper. As new materials and methods of using them have developed, the economic feasibility of substituting such materials for metals in the construction of fluid meters has improved. Thermoplastics represent one such class of material that can not only result in savings in the cost of materials but can also be more suitable for use with certain fluids.

Traditionally, plastic parts have been molded using conventional plastic injection molding techniques. Such techniques generally involve creating a mold having an internal cavity into which the plastic is injected in a molten state. Upon cooling the mold, the resulting plastic part may be removed by extraction or by opening the mold. Such techniques have been streamlined for mass production of plastic parts ranging from computer connectors to automobile components.

Unfortunately, traditional plastic injection molding techniques are difficult to apply when the part being manufactured has complex internal configurations. Fluid meters generally have complex internal passage ways complicating the use of conventional plastic injection molding techniques to manufacture housings or casings for fluid meters. While it is possible to manufacture such housings using conventional molding techniques, this proves to be time consuming and labor intensive.

For example, FIG. 1 depicts a cross-section of an exemplary mold 20 used with conventional plastic injection molding techniques. Mold 20 includes a cavity defined in part by internal walls 22 which correspond in shape to the external surface of a desired fluid meter housing. Multiple interconnected inserts 24, shown in FIG. 2, are placed within the cavity and correspond in shape to the internal surface of the fluid meter housing 26. Interconnected inserts 24 are typically constructed from a metal, such as stainless steel, having a relatively high melting point. Using the specifications of the fluid meter housing 26 sought to be formed, interconnected inserts 24 are carefully machined so that when assembled the external surface of the interconnected inserts 24 conforms to the internal surface of the fluid meter housing 26. Together, inserts 24 and internal walls 22 configure the shape of the cavity to correspond to the shape of housing 26.

Upon placing interconnecting inserts 24 into the cavity, mold 20 is closed under a press capable of applying forces of up to 150 tons to maintain closure of the mold 20. While closed, a molten thermoplastic material is injected at high pressures through port 28. A sufficient amount of material must be injected to fill the cavity that exists between walls 22 of mold 20 and the external surface of interconnected inserts 24. As the molten thermoplastic material begins to cool, it also begins to solidify and assume the shape of the fluid meter housing 26. Simultaneously, the thermoplastic material also begins to shrink. As a result, mold 20 must be quickly reopened so that fluid meter housing 26, now containing interconnecting inserts 24, can be removed. Interconnecting inserts 24 are then removed from the interior of housing 26. If the removal of interconnecting inserts 24 is not performed quickly after the thermoplastic material begins to cool, the interconnecting inserts 24 will be trapped inside the fluid meter housing 26.

The conventional technique above described is disfavored for several reasons. First, the temperature required for injecting the molten thermoplastic material complicates the handling of interconnecting inserts 24. Gloves or special equipment must be used to maneuver the inserts 24. Second, interconnecting inserts 24 are expensive to manufacture and a set is required for each mold being used in the manufacturing process. Third, if the interconnecting inserts 24 are not rapidly removed as the thermoplastic material cools, fluid meter housing 26 must be destroyed in order to remove the interconnecting inserts 24, and the entire process must be repeated.

SUMMARY OF THE INVENTION

The present invention provides a method of manufacturing a housing or casing for a fluid meter. In one example, the method of the present invention provides for injecting a molten material into a cavity or space formed between a core and a mold. The core and mold are configured such that the cavity between the surfaces of the core and mold forms the shape of the desired fluid meter housing. Upon allowing the molten material to cool or become rigid, the housing and the enclosed core are removed from the mold. The core is then heated to its melting point, or otherwise liquified, and drained or removed from inside the fluid meter housing. The present invention overcomes disadvantages of the prior art by providing a process whereby a fluid meter housing having relatively complex internal characteristics may be manufactured without the necessity of using expensive inserts or having to rapidly disassemble such inserts at high temperatures.

While variations of the present invention may be envisioned using the teachings disclosed herein, in one example of the present invention a first mold is provided having an internal surface that corresponds to the desired internal shape for a fluid meter housing. A metal in a molten state is injected into this first mold. The molten metal is then cooled until the metal solidifies to form a metal core in the shape of the internal surface of the fluid meter housing. After cooling, the resulting metal core is removed from the first mold.

A second mold is a provided having an internal surface that corresponds to the external shape desired for the fluid meter housing. This second mold and the core are configured so that upon placing the core into the second mold, a cavity is created that corresponds to the shape of the desired fluid meter housing. Upon placing the metal core into the second mold so as to create this cavity, a molten thermoplastic material is injected into the cavity so as to fill the cavity and form the fluid meter housing between the metal core and the second mold. The second mold and thermoplastic material are then cooled to cause the thermoplastic material to solidify into the shape of the fluid meter housing. The resulting fluid meter housing is then removed from the second mold. At this point in the process, the fluid meter housing may still contain the metal core. The metal core is heated until the metal reaches a molten state and can then be removed from the fluid meter housing. Alternatively, the metal core may be removed while the fluid meter housing is still within the second mold. This alternative requires that the materials used to construct the molds and housing have appropriate relative melting point temperatures.

The first and second mold can be configured with a variety of features desired for the fluid meter housing. By way of example only, the first and second molds may be configured for defining a fluid inlet and a fluid outlet for the housing. The first and second molds may also be configured for providing a plurality of tabs and a locking boss on the surface of the housing such that a register or other device may be attached. The first and second molds may also be configured such that the fluid meter housing is provided with resealable threaded connectors at the fluid inlet and the fluid outlet for connecting the housing to conduit or to the path of flow.

In another exemplary process of the present invention, a metal is heated until reaching a molten state. A first die is provided having an internal surface that is shaped identically to the internal surface of a desired fluid meter housing. The molten metal is inserted into the first die and then the temperature of the molten metal is lowered until the metal becomes capable of sustaining shape. This shape will correspond to the internal surface of the first die and therefore the internal surface of the fluid meter housing. The resulting metal shape is removed from the first die.

A second die is provided having an internal surface shaped to form the external surface of the fluid meter housing being manufactured. This second die is also configured for forming a cavity between the internal surface of the second die and the metal shape that corresponds to the geometry and thickness of the fluid meter housing. The cavity is created upon placing the metal shape into the second die. Molten plastic is then inserted into the cavity between the metal shape and the second die. After insertion, the molten plastic is cooled until it becomes rigid enough to retain the shape of the cavity and thereby form the fluid meter housing. The metal shape and housing are removed from the second die. The temperature of the metal shape is then raised until the metal becomes molten, thereby allowing the metal to be removed from the interior of the fluid meter housing.

In still another example of the present invention, a first material is provided having a melting temperature of T1. Using this first material, a core is formed having the desired geometry to form the internal shape of a fluid meter casing. Similarly, a shell is provided having an internal surface that corresponds to the external shape of the fluid meter casing. The core is located inside the shell so as to provide a space between the core and the shell that corresponds to the shape and dimensions of the fluid meter casing.

A second material is also provided having a melting temperature of T2. Melting temperature T2 of the second material must be greater than the melting temperature T1 of the first material. The second material is injected in a molten state into the space formed between the core and the shell. The second material is allowed to cool to a temperature less than T2 so that the second material will solidify and form into the shape of the fluid meter casing. Upon cooling, the fluid meter casing now contains the first material and may be removed from the shell. The first material is then heated to a temperature greater than T1 but less than T2. As a consequence, the first material will melt without melting the second material that forms the fluid meter casing. The first material may thereby be removed from the interior of the fluid meter casing.

In another example of the present invention, a meltable insert is positioned within a mold. The insert and the mold are both configured so as to create a void between the adjacent surfaces of the insert and the mold that is equivalent in shape and thickness to a fluid meter housing. A material is then introduced in a fluid state into the void so as to substantially fill the void. The temperature of the material is then reduced until the material becomes sufficiently rigid to maintain the shape of the fluid meter housing formed by the void. The fluid meter housing may then be removed from the mold. At this point in process, the fluid meter housing may still contain the insert. The insert is then heated until a temperature is reached at which the insert flows out of the fluid meter housing. This step may also be formed while the fluid meter is still within the mold if appropriate materials are selected for creating the insert, mold, and fluid meter housing.

In still another example of the present invention, a module is provided that corresponds to the internal shape of a casing for fluid meter. This module is constructed from a material that is meltable. A chamber is provided having an internal surface that corresponds to the external surface of the casing. The module is placed into the chamber so as to create a volume that corresponds to the shape and thickness of the casing. The resulting volume is then filled with a liquid. The liquid is then caused to harden and thereby assume the shape of the volume and form the desired casing. The module is then melted so as to enable the module to be removed from the casing. The casing may then be removed from the chamber. Alternatively, the casing may be removed from the chamber while still containing the module; and then the module may be melted so as to enable it to be removed from the casing.

Although the present invention has been discussed in terms of using a thermoplastic material for the construction of the meter housing, the present invention is not limited to such thermoplastic materials. Any material capable of being injected into the cavity and having a melting point higher than the melting point of the material used for the core may be utilized. Similarly, the core may be constructed from any material that will not chemically or physically react with the material selected for the fluid meter housing and is not limited to a metal alloy. However, the core must be constructed from a material having a melting point lower than the melting point of the material selected for the fluid meter housing if heat or elevated temperature is used to remove the core from the housing.

Additional objects and advantages of the invention are set forth in, or will be apparent to, those of ordinary skill in the art from the detailed description as follows. Also, it should be further appreciated that modifications and variations to the specifically illustrated and discussed features and variations hereof may be practiced in various embodiments and uses of this invention without departing from the spirit and scope thereof by using the teachings disclosed herein. Such variations may include, but are not limited to, substitutions of equivalent means, steps, features, and materials for those shown and discussed, and the functional or positional reversal or change in sequence of various means, steps, features, or the like.

BRIEF DESCRIPTION OF THE DRAWINGS

FIG. 1 is a cross-sectional and perspective view depicting a prior art technique.

FIG. 2 is a partial and exploded perspective view depicting a prior art technique.

FIG. 8 is a perspective view showing removal of such exemplary core from the fluid meter housing, in accordance with the subject invention.

DETAILED DESCRIPTION OF THE PREFERRED EMBODIMENTS

Reference now will be made in detail to the embodiments of the invention, one or more examples of which are set forth below. This example is provided by way of explanation of the invention, not limitation of the invention. It will be apparent to those skilled in the art that various modifications can be made in the present invention without departing from the scope or spirit of the invention. For example, features or steps illustrated or described as part of one embodiment may be used on or in another embodiment to yield a still further embodiment. Thus, it is intended that the present invention covers such modifications and variations as come within the scope of the appended claims and their equivalents. Other objects, features and aspects of the present invention are disclosed in or may be determined from the following detailed description. It is to be understood by one of ordinary skill in the art that the present discussion is a description of exemplary embodiments only and is not intended as limiting the broader aspects of the present invention.

Figure 3:
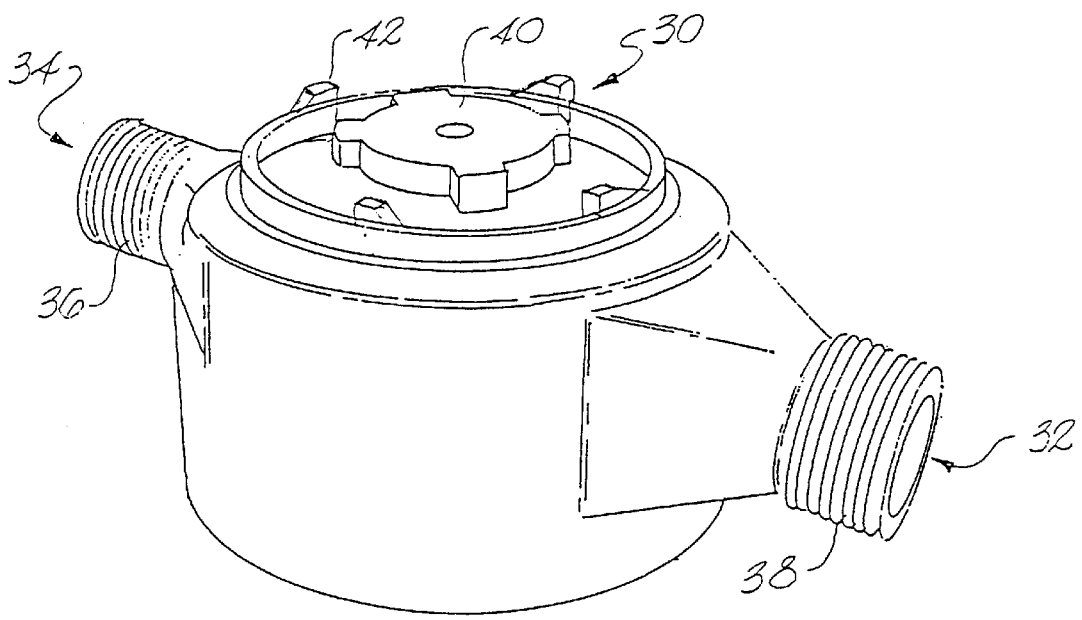
FIG. 3 is a perspective view of a shape of an exemplary conventional fluid meter housing, such as may be produced with practice of the present invention.

An exemplary fluid meter casing or housing 30 that may be formed using the method of the present invention is depicted in FIG. 3. Housing 30 may include a fluid inlet 32 and a fluid outlet 34. Resealable, threaded connectors 36 and 38 may be provided for selectively connected housing 30 into a fluid supply. Housing 30 also may include a locking boss 40 and a plurality of tabs 42 for connecting a chamber or register to housing 30 to operate in conjunction therewith. A variety of internal components may be contained within housing 30 depending upon the identity of the fluid being measured and the type of fluid measurements being undertaken. The present invention relates to a process for the manufacture of the housing 30 and therefore these internal components are not depicted.

Figure 4:
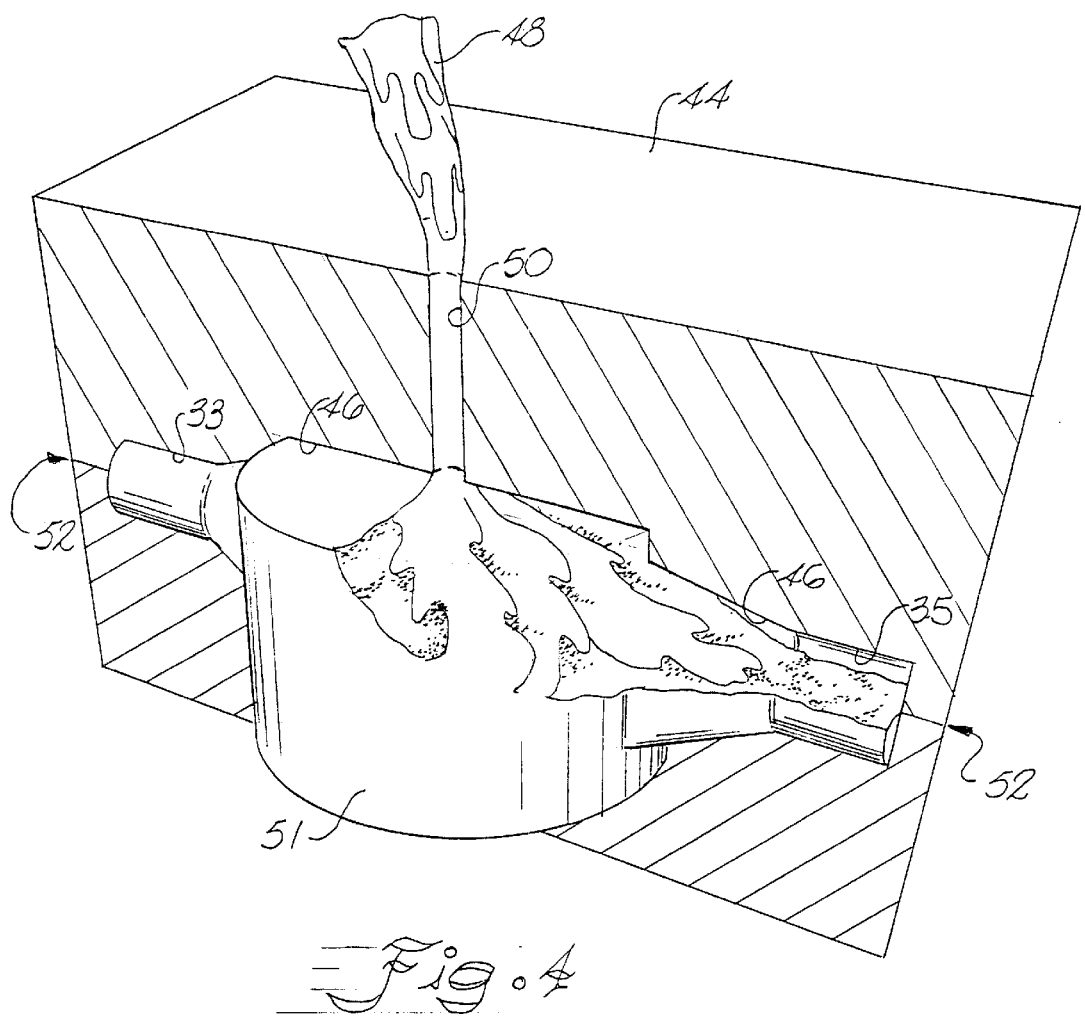
FIG. 4 is a partial cross-sectional view of an exemplary mold for a core.

A first mold 44 for use in one example of the present invention is shown in FIG. 4. First mold 44 is constructed to have an internal surface 46 that corresponds to the internal shape desired for housing 30. By varying the contour of internal surface 46, the internal characteristics of housing 30 can be determined. For example, first mold 44 includes conduits 33 and 35 which will form the fluid inlet 32 and the fluid outlet 34.

Upon providing or obtaining first mold 44 having an internal surface 46 with the desired characteristics, a first material 48 is injected, inserted, or introduced into first mold 44 through a port 50. FIG. 4 depicts this step of the process and demonstrates the interior of first mold 44 being filled with first material 48. After first mold 44 is filled, first material 48 is allowed or caused to solidify or harden. This step does not require an actual phase change in the traditional sense from liquid to solid but instead requires only that first material 48 changes into a condition where it is capable of assuming and maintaining the shape of first mold 44 upon being removed from first mold 44.

An example of a material that could be used for first material 48 would be a metal or a metal alloy. Accordingly, to prepare such a metal for introduction into the first mold 44, the metal would be heated until reaching a molten or liquid condition so that it can be poured, injected, inserted, or otherwise introduced into first mold 44. Upon filling the interior of first mold 44, first material 48 (i.e. the molten metal) is cooled until it hardens sufficiently to retain the internal shape of first mold 44. This step may be accomplished by simply subjecting first mold 44 to a reduced temperature, thereby allowing first material 48 to cool through conduction. The hardening of first material 48 forms an insert, module, or core 51 in the shape of the internal surface 46 of first mold 44 that may then be removed from first mold 44. As shown in FIG. 4, first mold 44 may be opened along seam 52 to enable removal of core 51.

Figure 5:
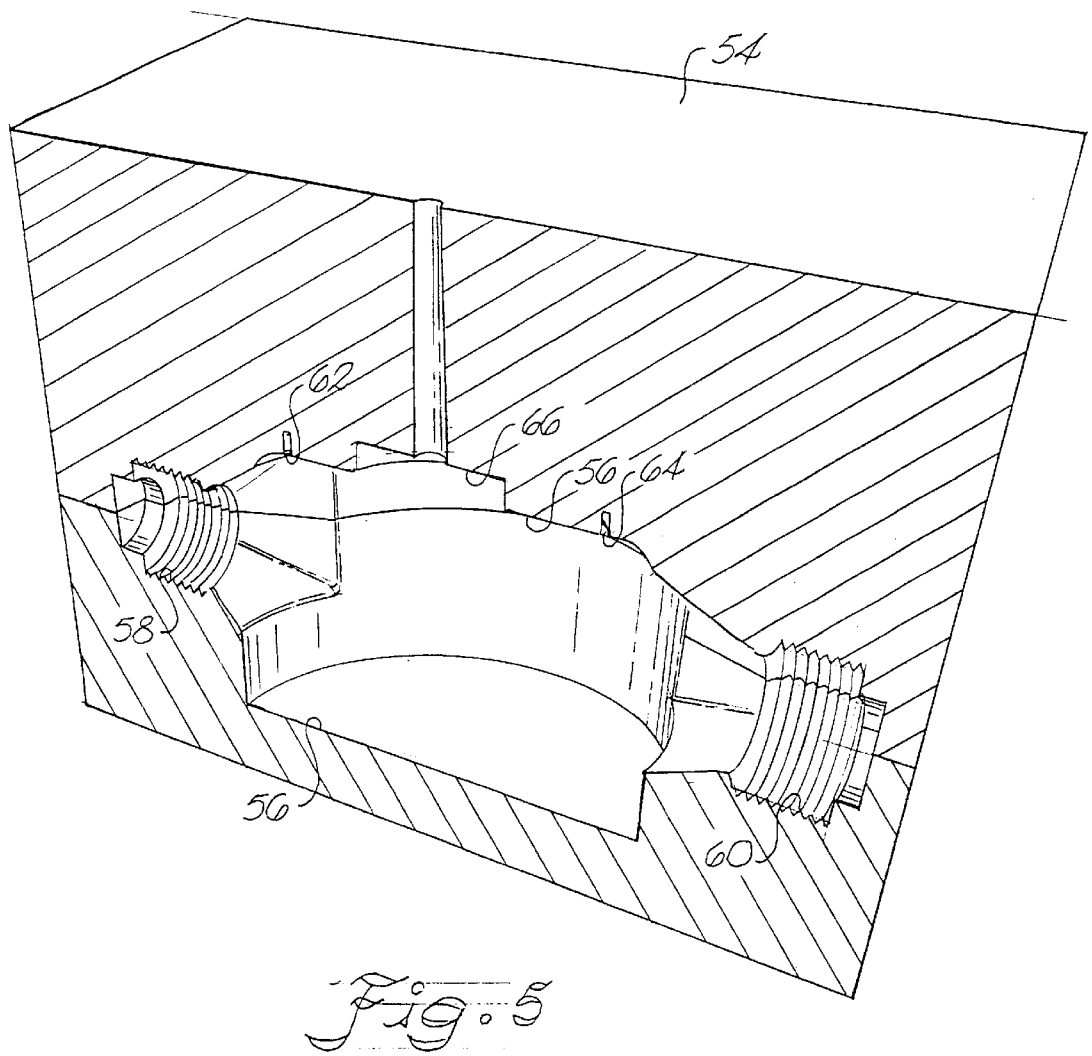
FIG. 5 is a cross-sectional view of an exemplary mold for the fluid meter housing.

As depicted in FIG. 5, a second mold 54 is used in accordance with this example of the present invention to create the external surface of fluid meter housing 30. Second mold 54 may also be referred to as a shell, die, or chamber. Similar to first mold 44, the internal surface 56 of second mold 54 is configured to provide the shape and desired features for the external surface of housing 30. By way of example, threads 58 and 60 will provide the external housing with resealable, threaded connectors 36 and 38. Indents 62 and 64, shown in cross-section in FIG. 5, provide a plurality of tabs 42 for housing 30. Recess 66, also shown in cross-section, provides for the formation of locking boss 40. These features are shown by way of example only; other desired features can be added to the external surface of housing 30 by making the appropriate modifications to the internal surface 56 of second mold 54.

Figure 6:
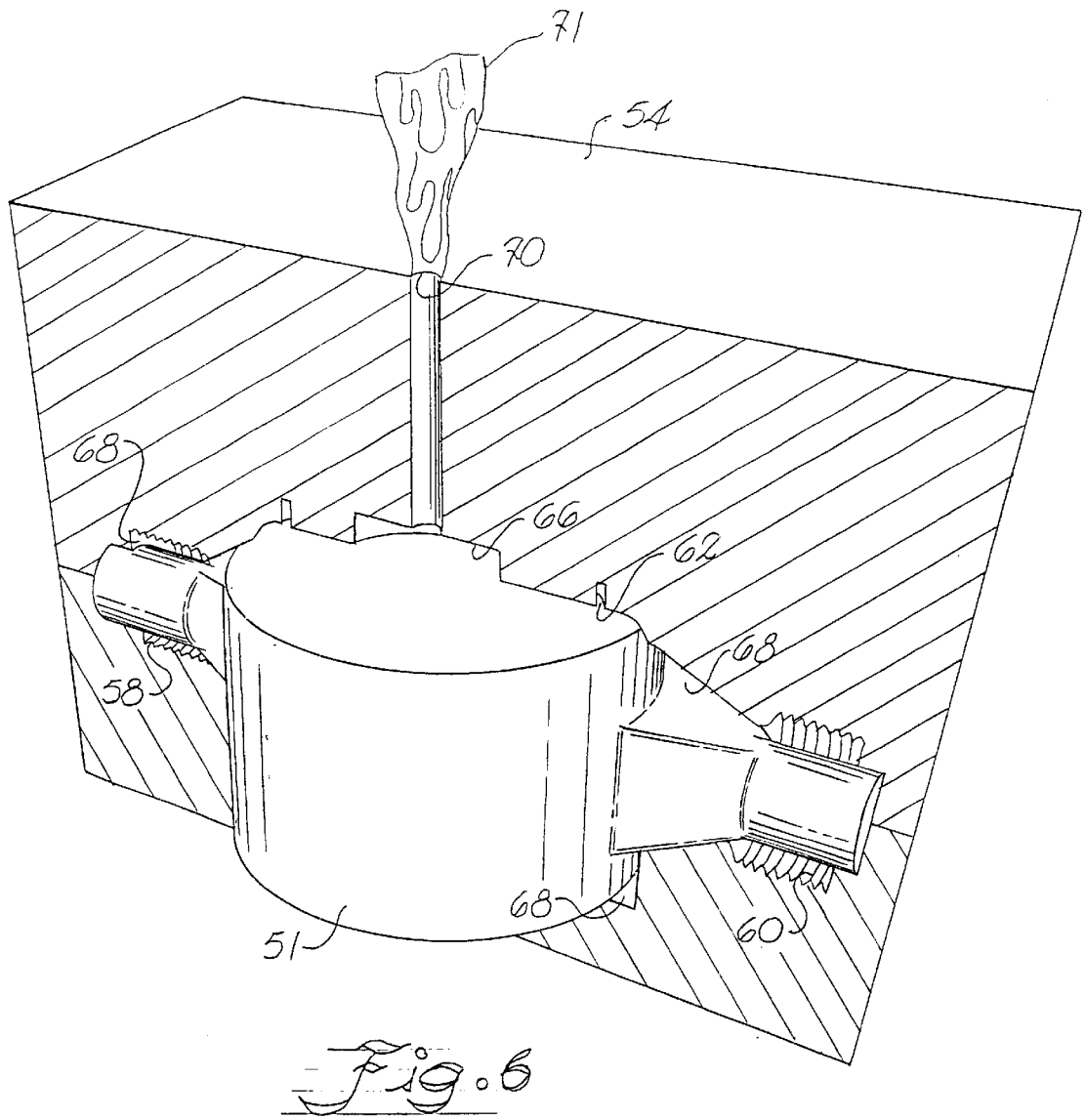
FIG. 6 is a partial cross-sectional view of an exemplary core inserted into an exemplary mold for the fluid meter housing, in accordance with the subject invention.

Referring now to FIG. 6, core 51 is placed or located into second mold 54 in accordance with the invention. In FIG. 6, second mold 54 is shown in cross-section while core 51 is depicted in full relief. By placing core 51 into second mold 54, a volume or space or cavity 68 is created. The geometry, shape, thickness, and dimensions of cavity 68 in accordance with the invention corresponds to or is substantially identical to the geometry, shape, thickness, and dimensions of the desired fluid meter housing 30. As described above, the external surface of core 51 and the internal surface of second mold 54 are configured or shaped to so create cavity 68.

Using port 70, a second material 71 is injected or inserted or introduced into cavity 68. After cavity 68 in second mold 54 is filled, second material 71 is allowed or caused to harden or solidify. This step does not require an actual phase change in the traditional sense from liquid to solid but instead requires that second material 71 change into a condition where it will assume and maintain the shape of cavity 68 formed between core 51 and second mold 54.

An example of materials that may be used for the second material are thermoplastics, thermosets, or epoxies. Accordingly, a thermoplastic would be heated to a molten or liquid-like state and then poured, injected, inserted, or otherwise introduced into cavity 68 through part 70. Upon filling cavity 68, the thermoplastic (second material 71) is cooled until it hardens sufficiently to substantially retain the shape of cavity 68. This cooling step may be accomplished by subjecting second mold 54 to a reduced temperature and allow conduction to cool the second material 71.

Figure 7:
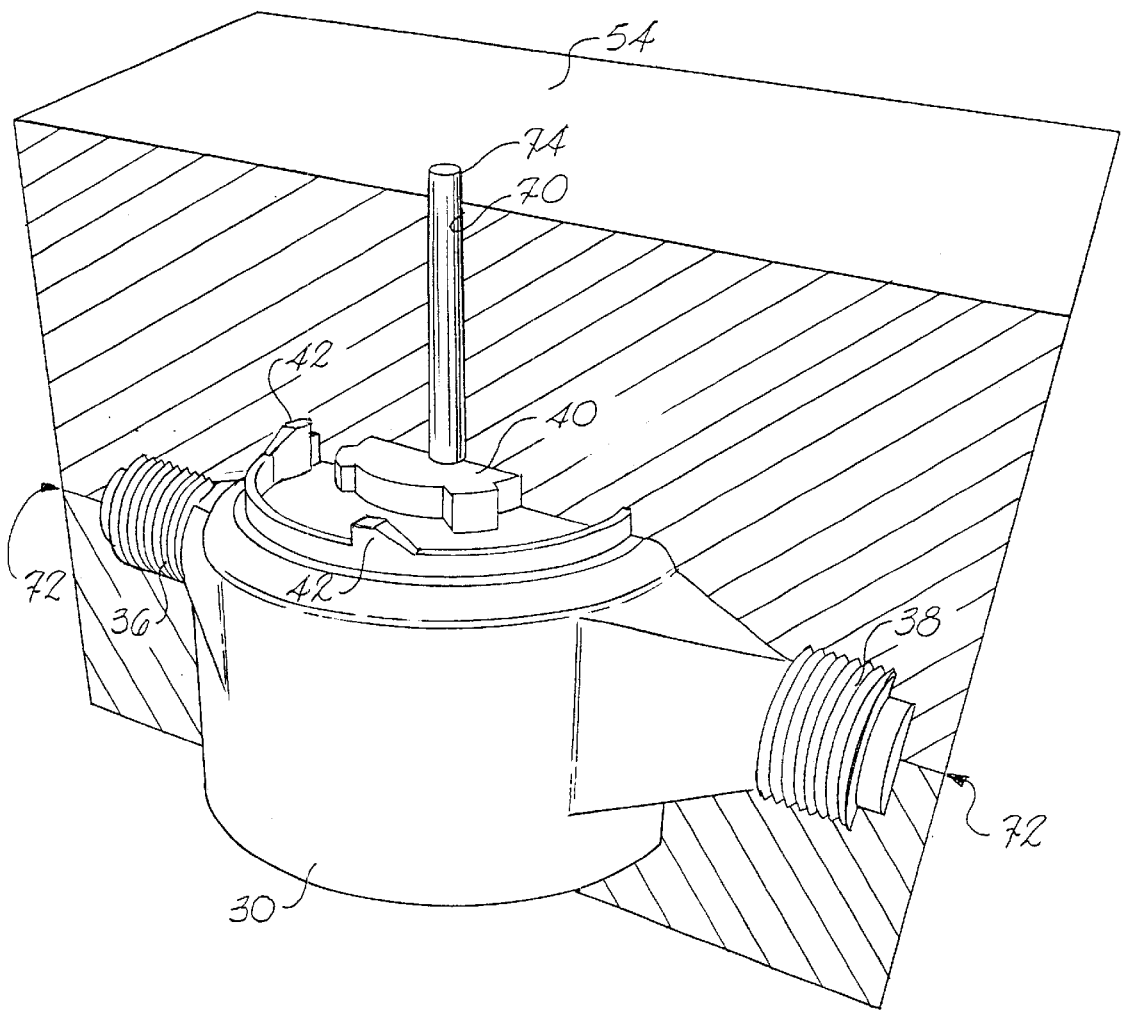
FIG. 7 is a partial cross-sectional view of an exemplary mold after formation of the fluid meter housing, in accordance with the subject invention.

The hardening or solidification of second material 71 forms the desired fluid meter housing 30 as shown in FIG. 7 (second mold 54 is shown in cross-section while housing 30 is shown in full relief). The hardened second material 71 also occupies port 70 to form a stem 74 that may be removed from housing 30 and discarded. After the second material has sufficiently hardened, the resulting housing 30 may be removed from mold 54 by separating mold 54 along seam 72. The removal of housing 30 also results in the removal of core 51 that is now enclosed or encompassed within housing 30. Accordingly, core 51 is now removed from the interior of housing 30.

FIG. 8 depicts one example of how core 51 may be removed in accordance with the subject invention from the interior of housing 30. A bath 76 is provided containing a hot oil 78. Housing 30 and core 51 are immersed into oil 78. The temperature of oil 78 is raised to a point where the material forming core 51 melts and leaks or flows out of housing 30 (which is shown in partial cross-section to allow depiction of the melting of core 51). The material of core 51 falls to the bottom of bath 76 where it may be collected and recycled in the inventive process.

It is to understood that FIG. 8 depicts only one example of the removal of core 51 from housing 30. Other alternatives exist and will be apparent to one of ordinary skill in the art using the teachings disclosed therein. For example, referring to FIG. 7, core 51 may be drained from the interior of housing 30 before removing either core 51 or housing 30 from second mold 54. Such a step may be accomplished by heating core 51 to its melting point while maintaining a temperature below the melting point of housing 30. Second mold 54 would be modified to provide an opening or drain for the release of the molten or liquified material 48 forming core 51.

As discussed above, various materials may be used for the formation of core 51 and housing 30, and any step may be used that allows for the change of such materials between liquid (or molten) conditions and rigid (or solid) conditions so that core 51 and housing 30 can be formed using the process of the present invention. Where the change between liquid (or molten) condition and solid (or rigid) condition is accomplished by heating and cooling, the material for forming core 51 should have a melting point temperature that is less than the melting point temperature of the material used for forming the housing 30. Otherwise, the heating of core 51 to remove it from housing 30 may undesirably result in both materials melting.

Although preferred embodiments of the invention have been described using specific terms, devices, steps, and methods, such description is for illustrative purposes only. The words used are words of description rather than of limitation. It is to be understood that changes and variations may be made by those of ordinary skill in the art without departing from the spirit and the scope of the present invention, which is set forth in the following claims. In addition, it should be understood that aspects of the various embodiments may be interchanged both in whole and in part. Therefore, the spirit and scope of the appended claims should not be limited to the description of the preferred versions contained therein.

What is claimed is:

1. A method of forming a fluid meter housing, comprising the steps of:

providing a first mold having an internal surface corresponding to the internal shape of a fluid meter housing;

injecting molten metal into said first mold;

cooling said first mold and molten metal until the metal solidifies forming a metal core shaped like the internal surface of the fluid meter housing;

removing said metal core from said first mold;

providing a second mold having an internal surface corresponding to the external shape of the fluid meter housing, said core and said second mold configured for creating a cavity in the shape of the fluid meter housing;

placing said metal core into the second mold so as to create said cavity;

injecting into said cavity a molten thermoplastic to fill the cavity formed between said metal core and said second mold;

cooling said second mold until the molten thermoplastic is solidified thereby forming the fluid meter housing;

removing from said second mold the fluid meter housing containing said metal core from said second mold;

heating the plastic fluid meter housing and metal core until the metal becomes molten; and removing the molten metal from the fluid meter housing;

wherein said first and second molds are further formed for providing a plurality of tabs and a locking boss on said fluid meter housing for detachable connection of a register.

2. A method as in claim 1, wherein said first and second molds are further formed for providing the fluid meter housing with resealable threaded connectors for resealably connecting the fluid meter housing at said fluid inlet and at said fluid outlet.

3. A method of creating a fluid meter housing, comprising the steps of:

heating a metal until it reaches a molten state;

providing a first die, wherein the internal surface of said first die is shaped identically to the internal surface of a fluid meter housing;

inserting the molten metal into the first die;

lowering the temperature of the molten metal until the metal becomes capable of sustaining shape;

removing the resulting metal cast from said first die;

providing a second die, said second die having an internal surface shaped as the external surface of the fluid meter housing and capable of forming a cavity between said metal cast and the internal surface of said second die such that the shape of said cavity corresponds to the geometry and thickness of the fluid meter housing;

placing said metal cast into a second die so as to create the cavity;

inserting molten plastic into the cavity between said metal cast and said second die;

cooling said molten plastic until the plastic retains the shape of said cavity and thereby forms the fluid meter housing;

removing said metal cast and the fluid meter housing from said second die;

raising the temperature of said metal cast until the metal becomes molten; and removing said molten metal from the interior of the fluid meter housing;

wherein said first and second dies are further configured for providing a plurality of tabs and a locking boss upon the fluid meter housing for detachably connecting a chamber.

4. A method as in claim 3, wherein said first and second dies are further configured for defining resealable threaded connections for resealably connecting the fluid meter housing at said fluid inlet and said fluid outlet.

* * * * *